W. P. GAUGHAN.
LAWN BROOM.
APPLICATION FILED DEC. 29, 1921.

1,429,579.

Patented Sept. 19, 1922.

INVENTOR
William P. Gaughan
BY John A. Naismith
ATTORNEY

Patented Sept. 19, 1922.

1,429,579

UNITED STATES PATENT OFFICE.

WILLIAM P. GAUGHAN, OF STOCKTON, CALIFORNIA.

LAWN BROOM.

Application filed December 29, 1921. Serial No. 525,652.

*To all whom it may concern:*

Be it known that I, WILLIAM P. GAUGHAN, a citizen of the United States, and resident of Stockton, in the county of San Joaquin and State of California, have invented a certain new and useful Improvement in Lawn Brooms, of which the following is a specification.

My invention relates to a combination broom and rake.

It is the object of my invention to provide a device for quickly and easily gathering the leaves, twigs and other débris, on lawns, gardens etc.

In the drawing,—

Figure 1:
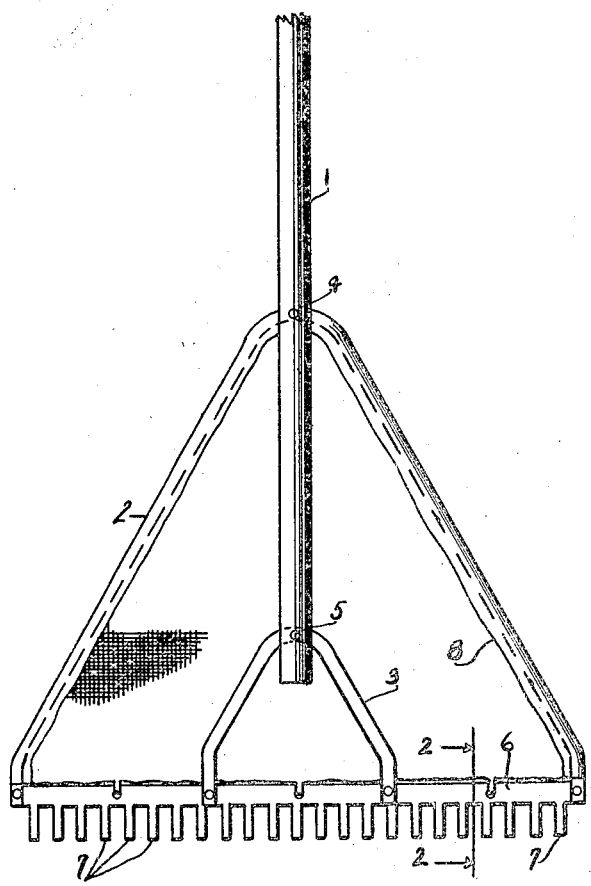
Figure 1 is a front elevation of the device.
Figure 2:
Figure 2 is a section on line 2-2 of Figure 1.

Referring more particularly to the drawing, at 1 I show a suitable handle having a pair of braces 2-3 secured thereto at their center points 4 and 5, the said braces lying in the same plane and spaced a distance apart as shown.

Braces 2-3 curve outwardly and downwardly from handle 1, with their outer ends in alignment and secured to a single bar 6. Bar 6 has a plurality of teeth 7 formed thereon and preferably curving slightly in a lateral direction thereto, the direction of curve of the teeth indicating the front of the device.

The braces 2 and 3 and the bar 6 support a fabric 8 which fills the spaces between the same.

In using the device, say for removing leaves from a lawn, the device is swung in the direction indicated by the arrow with the teeth 7 not quite touching the ground. The teeth themselves in passing along the surface of the grass collect some of the leaves in front of the device and the air set in motion by the forward sweep of the lawn broom blows the lighter leaves into heaps in front of it. Using the device in this manner the leaves are not rolled into compact masses as is the case with an ordinary rake, neither do the twigs and leaves clog up the teeth 7 as they do in a common rake.

The combined result of the arrangement of teeth and fabric is that all loose material on a lawn may be swept up into a pile in much less time than is possible with any form of rake, and this without in any way injuring the lawn.

The device is also useful in garden work generally, because it may be worked in and around plants and shrubs, the teeth readily removing all loose material close to the ground without danger of injuring growing plants.

The ease with which the device is used is due, of course, largely to the fact that it is not in contact with the ground, while an ordinary rake requires considerable effort that shortly becomes fatiguing because in each working movement it is dragged over the surface of the ground.

It should also be pointed out that the device herein described may be readily used as a shovel to throw the gathered leaves into large piles.

It is to be understood, of course, that while I have herein shown and described one particular embodiment of my invention, changes in form and construction may be made within the scope of the appended claim.

I claim:—

A lawn broom comprising a handle, supports mounted thereon and extending both sides thereof, a bar connecting said supports and sheet material mounted on said supports and bar in parallel relation to said handle and substantially filling the spaces between said supports and bar and teeth extending from said bar in substantially the same plane as said sheet material.

WILLIAM P. GAUGHAN.